July 19, 1932.  L. CONSTANTIN  1,868,047
ORIENTING AND AUTOMATIC STOPPING DEVICE FOR WIND MOTORS
Filed March 30, 1929  3 Sheets-Sheet 1
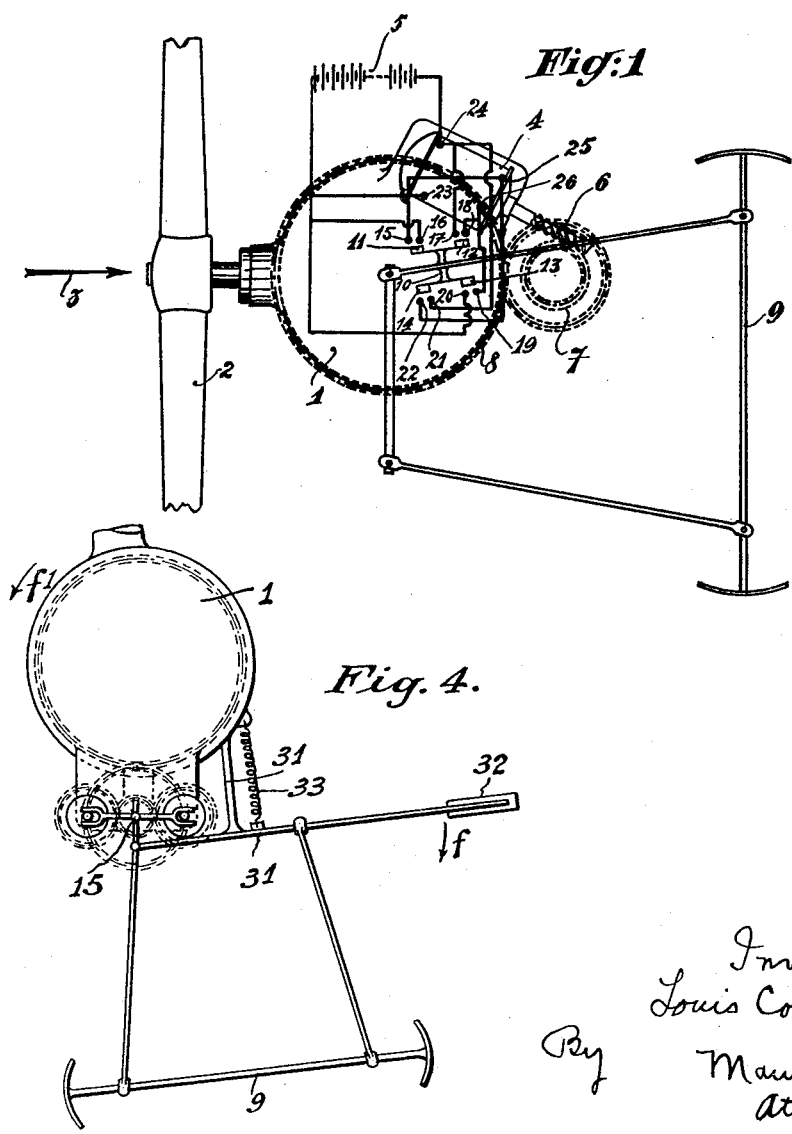
Inventor:-
Louis Constantin
By Mauro & Lewis
Attorneys July 19, 1932.  L. CONSTANTIN  1,868,047
ORIENTING AND AUTOMATIC STOPPING DEVICE FOR WIND MOTORS
Filed March 30, 1929   3 Sheets-Sheet 2
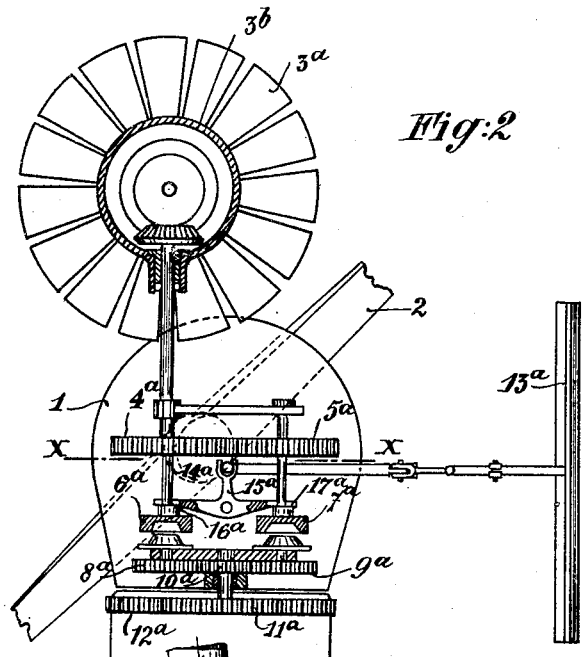
Fig:2
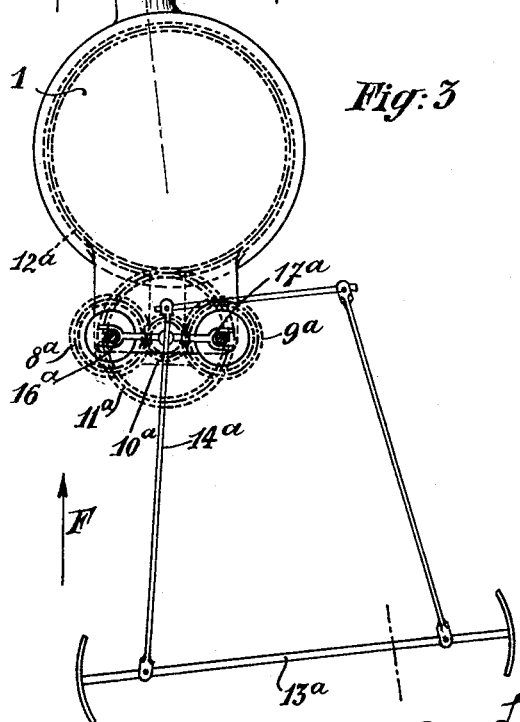
Fig:3
Inventor
Louis Constantin
Mauro + Lewis
Attorneys Patented July 19, 1932

1,868,047

UNITED STATES PATENT OFFICE

LOUIS CONSTANTIN, OF PARIS, FRANCE, ASSIGNOR OF ONE-HALF TO PAUL FORTIER-BEAULIEU, OF ROANNE, LOIRE, FRANCE

ORIENTING AND AUTOMATIC STOPPING DEVICE FOR WIND MOTORS

Application filed March 30, 1929, Serial No. 351,312, and in France April 4, 1928.

My invention relates to an automatic orienting and disappearing device for wind motors, which is simple, progressive and sure.

It is known in the art to utilize for orienting wind motors the combination of a windvane such as the type disclosed and claimed in my patent application Serial No. 512,367, filed November 2, 1921, with a biasing servomotor which furnishes the necessary power for the movement of orientation. Said auxiliary biaser is oriented itself by the windvane in a way that it can, at the moment desired, furnish the energy necessary, but since the orientation in many cases is only approximative, the dimensions of said apparatus, as well as those of the windvane must be considerable, all of which gives rise to disadvantages.

It is likewise known in the art to borrow the necessary energy for the movement of orientation from the wind motor itself, the energy being likewise regulated by the action of a windvane preferably a windvane of the Constantin type above referred to.

But in this case, when the wind stops completely, and then starts in a very different direction than formerly, the wind motor remaining stationary cannot furnish any energy and the orientation cannot be accomplished.

The orienting and disappearing device forming the object of my present invention, allows through the medium of any kind of windvane, but preferably a windvane of the Constantin type, above referred to, to utilize the energy furnished either by an electric motor always ready to be set in motion, or by an auxiliary biaser always running and always ready to be locked in the desired direction, or by another suitable motor.

The invention will be more readily understood with reference to the accompanying drawings forming part of this specification, and in which—

Fig. 1 is a plan view of my device showing an embodiment with an electric motor;

Fig. 2 is an elevational view looking in the direction of the arrow F of Fig. 3 of a second embodiment in which the orienting energy is furnished by an auxiliary biaser;

Fig. 3 is a plan view of the parts beneath the line X—X of Fig. 2;

Fig. 4 is a view analogous to Fig. 3 of a stopping paddle in combination with the orienting arrangement.

Figure 5:
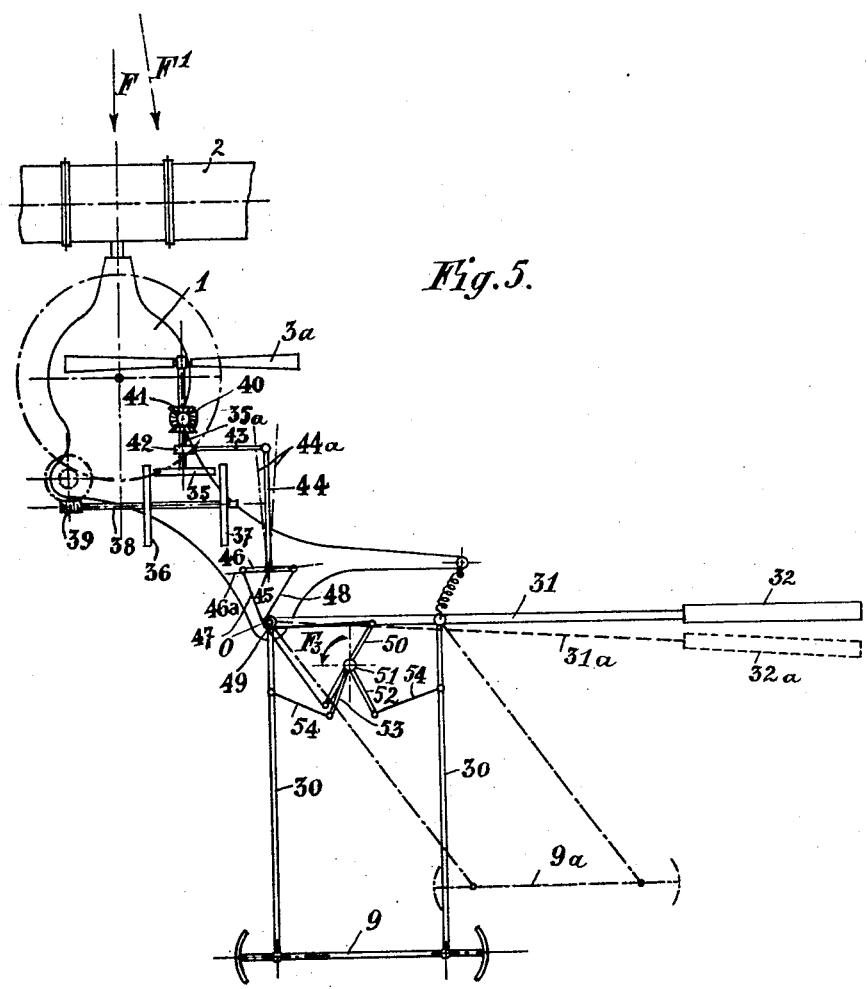
Fig. 5 is a general view of a modified form of device.

Referring to the drawings more in detail, and particularly to Fig. 1, 1 designates the movable head enclosing the transmission mechanism of the energy furnished by the wind motor 2 under the influence of the wind travelling in the direction indicated by the arrow 3. On said movable head is fixed the electric motor 4, assumed to be of the direct current type, fed by an electrical source 5 and controlling orientation through the medium of the tangent screw 6 of the gear 7 and toothed ring 8, rigid with the tower.

The windvane 9, preferably of the Constantin type aforementioned, but which might be any sort of windvane, is likewise fixed to the movable head and carries on one of its arms, an insulating support 10 provided with four conducting brushes 11, 12, 13 and 14 placing in electrical communication the contacts 15 and 16, 17 and 18 on the one hand and contacts 19 and 20, 21 and 22 on the other hand respectively, according to whether, following a change in orientation of the wind, the arm of the windvane has deviated to one side or the other.

On the electric motor 4 the terminals 23 and 24 are the exciting terminals and are always energized with current. The terminals 25 and 26 are the line terminals and it will be obvious from the connections indicated on the figure, that depending on whether the arm of the windvane becomes deviated to one side or the other the electric motor will turn in one direction or the opposite direction.

It is therefore merely necessary that the directions of rotation be judiciously chosen in order that the orientation take place in the direction desired. When the arm of the windvane which follows the general movement of orientation, comes again to the mean position illustrated in the figure, all the circuits will be opened and the motor stopped.

The motor employed could be, for example, a tri-phased current motor; in which case there would be three terminals instead of four and it would be only necessary that the reversing switch should reverse the current fed to any one of said terminals.

The motor could also be stationary and rigid with the pylon or tower. In this case the ring 8 would be rigid with the movable head. This is the type of construction which is suitable to Dutch windmills with movable head.

In Figs. 2 and 3, 1 designates the movable head enclosing the mechanism for transmission of the energy furnished by the wind motor 2 and carrying the auxiliary biaser $3^a$ through the medium of a pivotal housing $3^b$ suitably disposed. Said biaser is oriented by any of the systems known in the art in a way to always be running when there is wind. It turns constantly two gear wheels $4^a$ and $5^a$ in mesh with each other. Each of said two gear wheels is adapted to control by means of friction clutches $6^a$ and $7^a$ the gears wheels $8^a$ and $9^a$ respectively both of which are in mesh with the pinion $10^a$ and are adapted in turn to control the gear wheel $11^a$ which meshes with the toothed ring $12^a$ stationary and rigid with the tower.

It will be obvious that when the clutch $6^a$ is in engagement, the gear wheels $5^a$ and $9^a$ turn loosely and the whole becomes displaced in a certain direction. In the opposite case, the clutch $7^a$ is in engagement and only the wheel $8^a$ turns loosely and the displacement takes place in the opposite direction.

The windvane $13^a$, preferably of the Constantin type, as shown, but which could be any sort of windvane, and of which the left part is shown in Fig. 2, for clearness, controls by means of its arm $14^a$ of which only a part is illustrated, and through the lever $15^a$, the two clutch forks $16^a$ and $17^a$.

It will be obvious that, according to the change in direction of the wind taking place on one side or the other, the clutch $6^a$ or the clutch $7^a$ will come into engagement and the displacement of the movable head will take place to one side or the other. It is only necessary to give the blades of the biaser the proper twist which produces the desired orientation.

It is to be understood that the biaser could be replaced by any type of motor.

Likewise the transmissions of the reverser of movement could be replaced by other transmissions or another type of mechanical reverser.

The windvane can also be displaced in addition by any of the well known means in the art, whether for the purpose of disappearing for the purpose of regulating the wind motor and the orientation arrangement hereinbefore disclosed will respond to such displacement and operate correctly.

For disappearing (Fig. 4) the side 31 of the quadrilateral of the windvane bears on a stop $31^a$ and is extended by a disappearing blade 32 connected to the frame 1 of the orientable head by an opposing spring 33 suitably regulated.

When the speed of the wind exceeds the limit fixed in advance the opposing spring yields and the stopping blade swings under the action of the wind the arm 31 about the point 15 in the direction indicated by the arrow $f$ which causes a deformation of the windvane such that the arm 9 rests perpendicularly to the wind in accordance with the properties well known in the Constantin type of wind vane. Such deformation of the windvane carries with it an engaging of the clutch and consequently a rotation of the movable head in the direction of the arrow $f_1$ until the tension of the spring 33 which by reason of this movement increases and balances the force of the wind on the blade.

In the modified form of embodiment illustrated in Fig. 5 and based on the same principle as the device described in connection with Figs. 2, 3 and 4, operation takes place by means of a clutch and motion reversing arrangement having rollers and friction plates actuated by an arrangement of cables and bearings connected to the arms of the windvane. This orientation device is combined with a disappearing device having a paddle carried as an extension of one of the parallel sides of the quadrilateral of the windvane.

The movable head 1 of the chief turbine wheel carries an auxiliary biaser $3^a$ normally rotating and adapted to control through the medium of beveled gears 40, friction clutch 35, 36, 37, shaft 38 and tangent screw 39, the orientation of the said movable head in a way to be explained later on. The friction roller 35 is normally disengaged from plates 36 and 37 in a way that the biaser $3^a$ turns loosely. On the shaft $35^a$ of the roller 35 is loosely mounted a collar 42 carried by a rod 43 pivoted to a lever 44 pivoted at 45. Said lever 44 is rigid with a cross bar 46 pivoting on the same shaft 45 and connected to cables 47 and 48 passing over pulleys 49 fixed on the one hand to the extremities respectively of a lever 50 keyed to a middle shaft 51. On said shaft are on the other hand keyed the levers 52 and 53 connected by means of rods 54 to the arms 30 of the Constantin windvane 9.

Said windvane is pivoted at 0 on the movable head 1 coaxial with the pulleys 49 and the arm 31 carries furthermore as an extension thereof a vertical paddle 32 serving for disappearing.

The operation takes place as follows:

Suppose first of all that the direction of the wind is that of the arrow F corresponding to the position of the device represented by full lines on the drawing. If the wind changes and takes, for example the direction of the arrow F¹ indicated in dotted lines, the windvane 9 will take the position 9ª likewise indicated in dotted lines and such that the arm 9 will be perpendicular to F¹ according to the well known property of this type of windvane. This has for effect, as will be obviously seen from the drawings, to turn through the medium of rods 54 and levers 52 and 53, the shaft 51 and consequently the cross bar 50 in the direction of the arrow F³. The cable 47 is then stretched whereas the cable 48 is slack. The cross bar 46 and the lever 44 therefore swinging in a way to occupy the positions 44ª and 46ª indicated in dotted lines on the figure by imparting a thrust to the link 43. The shaft 35ª then swings slightly about the point 40 towards the left of the figure and the friction roller 35 enters in contact with the corresponding plate 36 and the shaft 38 is placed in rotation by the biaser 3ª for orientating the principal turbine 2.

If the force of the wind becomes at a given moment too high and exceeds the tension of spring 33, the arm 31 carrying the blade 32 will swing about the point 0 and take the position 31ª indicated in dotted lines. The articulated quadrilateral of the windvane will then become deformed in a manner before described, the arm 9 of the windvane resting perpendicular to the direction of the wind. This deformation of the quadrilateral of the windvane produces as previously a tension and slacking of the cables 47 and 48 and the placing in action of the clutch 35—36—37. The whole of the movable head will turn until the paddle 31 again becomes perpendicular to the direction of the wind, the tension of the spring 33 balancing the force of the wind.

While I have disclosed what I deem to be the preferred forms of my device I do not wish to be limited thereto as there might obviously be many changes made in the arrangement and construction of the constituent parts without departing from the spirit of my invention as comprehended within the scope of the appended claims.

Having described my invention what I claim as new and desire to secure by Letters Patent is:

1. A device for orienting wind motors having a rotatable head carrying said wind motor comprising, in combination, a wind-vane having orienting surfaces mounted upon an articulated quadrilateral, an auxiliary wind motor and a double clutch controlled by said wind motor adapted to initiate by means of said auxiliary wind motor the rotation of said rotatable head.

2. A device for orienting wind motors having a rotatable head carrying said wind motor, comprising in combination a wind-vane having orienting surfaces mounted upon an articulated quadrilateral, an auxiliary wind motor, a double clutch and a system of cables connecting the said clutch to the said wind-vane.

3. A device for orienting and disappearing wind motors having a rotatable head carrying said wind motor, comprising, in combination, a wind-vane, an auxiliary wind motor, a double clutch, a system of cables connecting said clutch to said wind-vane and a disappearing blade combined with said wind-vane.

4. A device for orienting wind motors having a rotatable head for carrying said wind motor, which comprises a single servo-motor adapted to rotate said head in both directions and a windvane having orienting surfaces mounted upon an articulated quadrilateral for causing said servo-motor to drive said rotatable head in the required direction.

5. A device for orienting wind motors having a rotatable head for carrying said wind motor, which comprises a single servo-motor adapted to rotate said head in both directions, a windvane comprising an articulated quadrilateral and orienting surfaces mounted upon one side thereof, and means actuated by one of the adjacent sides of the quadrilateral for causing said servo-motor to drive said rotatable head in the required direction.

6. A device for orienting wind motors having a rotatable head for carrying said wind motor which comprises a single servo-motor adapted to rotate said head in both directions, a windvane comprising an articulated quadrilateral and orienting surfaces mounted upon one side thereof, means actuated by one of the adjacent sides of the quadrilateral for causing said servo-motor to drive said rotatable head in the required direction, a blade carried by the side of the quadrilateral opposite the first mentioned side for deforming said quadrilateral and operating said servo-motor under the action of the wind, and elastic means for opposing the action of said blade up to a certain velocity of the wind whereby the wind motor can be caused to disappear when the wind becomes too strong.

7. A device for orienting wind motors having a rotatable head for carrying said wind motor which comprises a single electric motor adapted to rotate said head in both directions, a windvane comprising an articulated quadrilateral and orienting surfaces mounted upon one side thereof, and a current reverser actuated by one of the adjacent sides of the quadrilateral for causing said electric motor to drive said rotatable head in the required direction.

8. A device for orienting wind motors having a rotatable head for carrying said wind motor which comprises a single electric motor adapted to rotate said head in both directions, a windvane comprising an articulated quadrilateral and orienting surfaces mounted upon one side thereof, a current reverser actuated by one of the adjacent sides of the quadrilateral for causing said electric motor to drive said rotatable head in the required direction, a blade carried by the side of the quadrilateral opposite the first mentioned side for deforming said quadrilateral and operating said electric motor under the action of the wind, and elastic means for opposing the action of said blade up to a certain velocity of the wind, whereby the wind motor can be caused to disappear when the wind becomes too strong.

In testimony whereof I have signed this specification.

LOUIS CONSTANTIN.